United States Patent [19]

Hubner et al.

[11] 4,199,170

[45] Apr. 22, 1980

[54] CARRIER MEANS

[76] Inventors: Betty A. Hubner, 121 Sweetwater; James R. McNeil, Jr., 85 Appleton St., both of Saugus, Mass. 01906

[21] Appl. No.: 792,920

[22] Filed: May 2, 1977

[51] Int. Cl.² ............................................. B62B 3/02
[52] U.S. Cl. ................................. 280/641; 280/651
[58] Field of Search ............................. 280/651–654, 280/641, 642, 643, 649; 248/214, 226.3, 289 R; 224/42.03 R, 42.03 A, 42.03 B, 42.07

[56] References Cited

U.S. PATENT DOCUMENTS

| 2,180,333 | 11/1939 | Boggia | 248/214 X |
| 2,379,994 | 7/1945 | Schwinn | 224/42.03 B |
| 2,613,951 | 10/1952 | Rusnak | 280/651 |
| 3,082,016 | 3/1963 | Pratt | 280/641 |
| 3,168,328 | 2/1965 | Hill, Jr. | 280/641 |
| 3,183,877 | 5/1965 | Benzel | 248/289 X |
| 3,504,831 | 4/1970 | Highnote | 224/42.03 B |
| 3,891,132 | 6/1975 | Chandler | 224/42.03 B |

*Primary Examiner*—Robert R. Song
*Assistant Examiner*—Norman L. Stack, Jr.
*Attorney, Agent, or Firm*—Herbert L. Gatewood

[57] ABSTRACT

There is provided in accordance with the invention a shopping cart or carrier for carrying a plurality of relatively small objects. The shopping cart has a collapsible body member supported by a collapsible supporting structure. The supporting structure is provided with wheels for movement of the carrier or the shopping cart in a linear direction and casters for turning motion. The shopping cart or carrier is supported for transport on the bumper of an automobile by brackets.

6 Claims, 7 Drawing Figures

CARRIER MEANS

BACKGROUND OF THE INVENTION (1) Field of the Invention

This invention relates to a carrier means for carrying a plurality of relatively small objects such as groceries and the like, and a means attachable to a motor vehicle for supporting the carrier for transport, and to their combination.

(2) Description of the Prior Art

It is common for markets selling groceries or other consumer articles to have a number of wheeled carriers or shopping carts nearby for the convenience of shoppers in making their various purchases. A shopper, generally, on entering the store, selects a carrier from a storage area and keeps it with him during the time that he is in the store and making purchases. The shopping cart is pushed up and down the aisles in which various merchandise is stocked on each side and items are selected for purchase and placed in the shopping cart until the shopper is finished shopping. Then the shopper goes to a check-out station at which the various items are checked by a store clerk, the prices rung up on a cash register, and the items bagged to be carried home by the shopper.

Oftentimes, a shopper will have his bagged purchases placed in the shopping cart for convenience in carrying the bags to his automobile for transportation home. Although many shoppers return the shopping cart to the storefront after use, others abandon the carts at random in the vehicle parking area. These abandoned shopping carts become a nuisance to other drivers. Drivers unaware of the presence of these carts often run into the carts with their vehicles, resulting in either damage to the vehicle, or shopping cart, or both. This results in customer complaints and may, in some instances, result in liability by the store owner for damages. Carts that are damaged must be repaired or, if too damaged, replaced with a new one. Furthermore, and of additional expense to the storeowner, shopping carts left in the parking area often are stolen.

To reduce customer complaints, and the expense involved in maintaining an adequate inventory of shopping carts, one or more employees of the storeowner is generally required, periodically, to accumulate all of the abandoned shopping carts in the parking area and return them to the storage area in the store for shopper's use. Otherwise, incoming shoppers are left with no shopping carts by means of which they can carry their purchases. This, too, results in added operational expense, but if not faithfully performed makes for dissatisfied customers.

Not only is there expense to the storeowner resulting from damaged vehicles and damaged and stolen shopping carts, and from the necessity in having the shopping carts periodically accumulated and returned to the store for incoming shoppers, but the store owner must spend a considerable sum each month in maintaining his inventory of shopping carts in proper working order.

SUMMARY OF THE INVENTION

The invention disclosed herein comprises a means for carrying a plurality of relatively small objects such as groceries and the like from one desired location to another comprising broadly in combination a collapsible, wheeled carrier for the objects and means attachable to a motor vehicle for supporting the carrier for transport.

The wheeled carrier comprises a body member having the structural configuration of an open-topped rectangular shaped box to the planar bottom of which is quite advantageously connected a collapsible supporting structure for supporting the body member. Connected to the collapsible supporting structure are wheels for movement of the carrier in a linear direction, i.e., backward and forward, and casters or wheels to provide for turning of the carrier, as desired.

Another advantageous and preferred feature of the invention is that the body member is also collapsible. Thus, with the collapsibility of the supporting structure, the collapsibility feature of the body member provides that the carrier need less space for storage of the carrier when not in use.

A further feature of the invention is the provision of a covered bag or insert conforming to the inside surface of the body member in which can be directly placed the items purchased. This is advantageous as it permits the articles carried to be covered during inclement weather.

The carrier or shopping cart of this invention in combination with the means attachable to a motor vehicle for supporting the carrier for transport provides a ready means for the individual homeowner to easily accomplish the grocery shopping. The shopper is always assured of a shopping cart for use during his shopping venture. Moreover, the shopping cart or carrier of the invention offers a further advantage in that during inclement weather, the shopper is not bothered with transferring bags of groceries from a shopping cart to his automobile but can merely place the shopping cart or carrier with the groceries therein onto the vehicle support for transport to his residence. This is done simply and with little effort. At the destination end, the shopping cart is removed from the vehicle support and taken directly into the house or apartment for removal of the groceries in the kitchen or wherever else desired. The shopping cart can then be collapsed and stored in a desirable area until it is needed once again for shopping.

Ownership by individuals of shopping carts in accordance with this invention is, moreover, extremely advantageous to the storeowner now maintaining a rather large inventory of shopping carts. Costs of operations to the storeowner will be somewhat reduced as the inventory of carts needed by the store or market can be reduced as time goes on. As the shopping cart of the invention is owned by the individual shoppers, these carts will not be abandoned in the parking lot to become a nuisance to drivers.

BRIEF DESCRIPTION OF THE DRAWING

The above and other objects and advantages of the invention will best be understood from the following detailed description of a preferred embodiment thereof, taken in connection with the appended drawings, in which.

DETAILED DESCRIPTION OF THE INVENTION AND PREFERRED EMBODIMENTS

Figure 1:
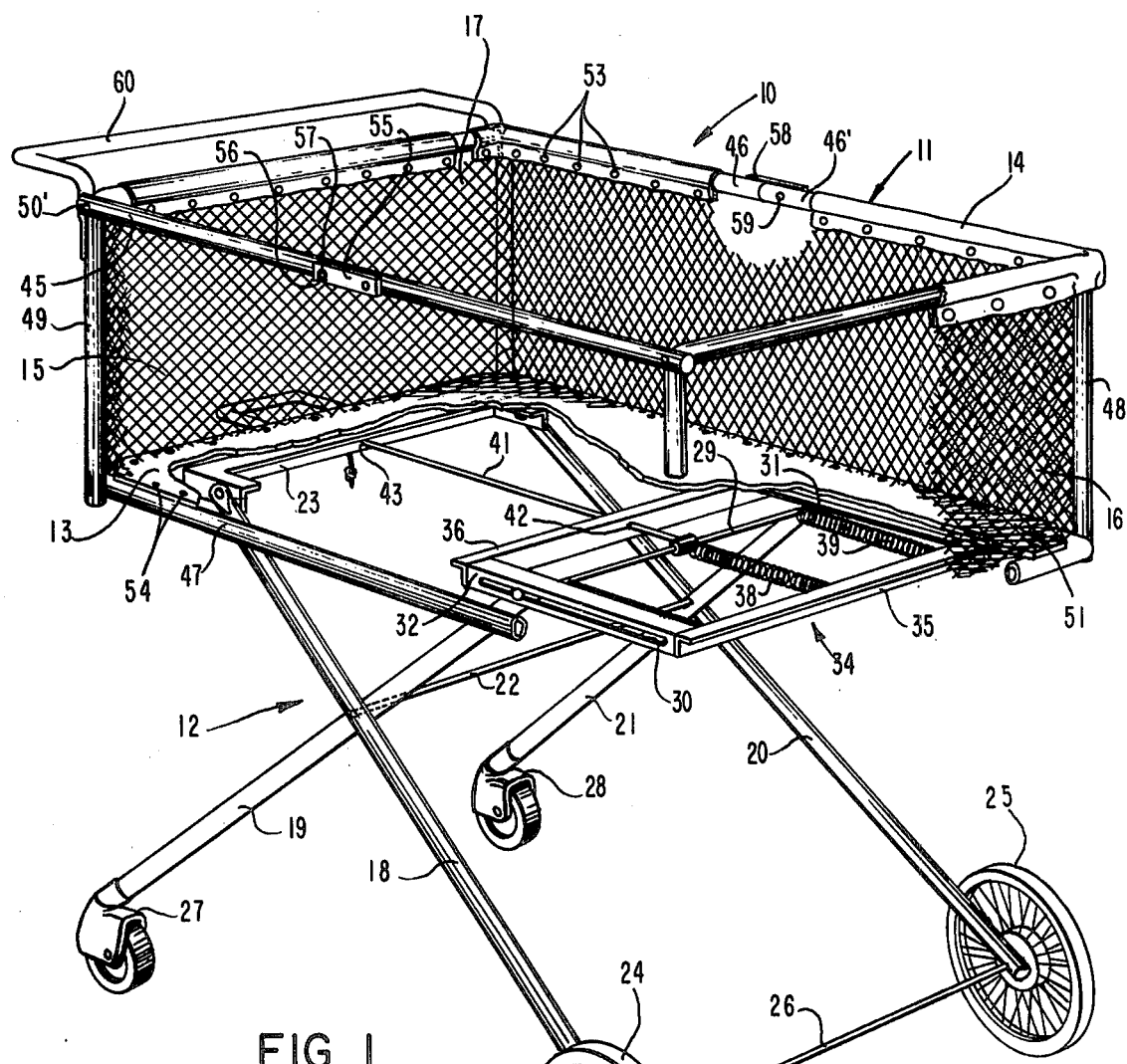
FIG. 1 is a view in perspective of a shopping cart or carrier in accordance with the invention.

Turning now to the drawing, there is shown therein in FIG. 1 a shopping cart or carrier 10 having a body member 11 and collapsible support assembly 12. Body member 11, as shown by the drawing, has the structure of an open top rectangular box; however, it will be appreciated that the body member need not be rectangular but can be of a square shape, if desired. Body member 11 has a flat, planar bottom 13, right and left sides 14, 15 and front and back ends 16, 17.

The collapsible support assembly 12 for body member 11 comprises two pairs of elongated support members 18, 19 and 20,21. These pairs of elongated support members are spaced apart and pivotally connected, as shown in the drawing, by means of a conventional elongated connecting means 22. The upper ends of elongated support members 18,20 are fixedly connected to a spacer bracket 23 but in such a fashion as to allow the support members to pivot toward and away from the underside of bottom 13 of body member 11 as desired. This can be accomplished by means of rivets, bolts or the like in usual fashion. Spacer bracket 23 can be of angle iron or other configuration and is attached to the underside of bottom 13 in such a fashion as to maintain the desired spaced apart relationship of the pairs of elongated support members.

Figure 2:
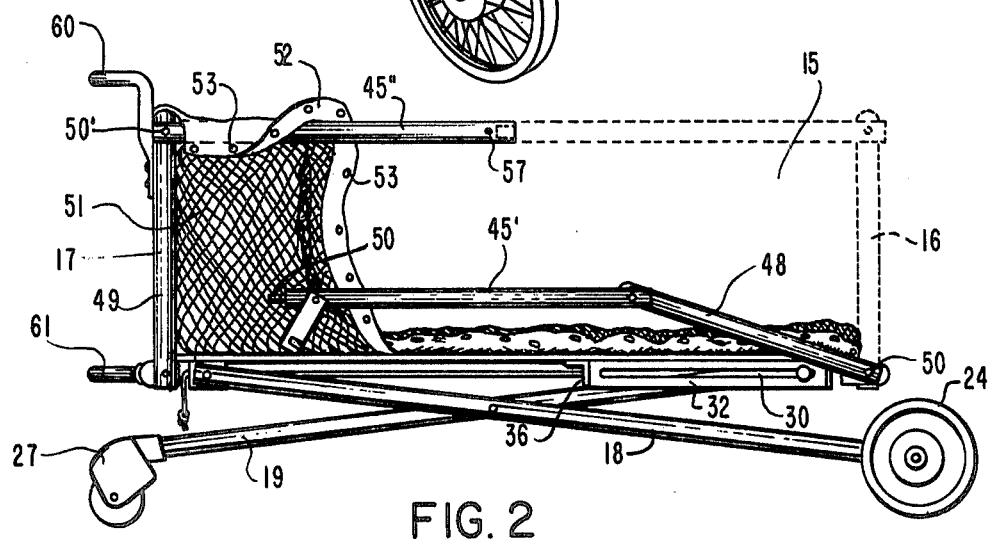
FIG. 2 is a side view of the carrier shown in FIG. 1 showing the supporting structure for the body member of the carrier in collapsed condition.

Wheels 24,25 are attached to elongated support members 18, 20 respectively at their lower ends. This is accomplished by axle means 26 according to usual techniques, which is of suitable length to maintain the spaced apart relationship of elongated members 18, 20. Axle 26 is, in the preferred embodiment of the invention, of slightly greater length than the width of body member 11, and the wheels are so positioned thereon, as to allow support assembly 12 to collapse to the minimum thickness possible. Accordingly, axle means 26 will, when support assembly 12 is collapsed, be closely adjacent bottom 13 as indicated in FIG. 2 of the drawing. Thus, the carrier will require only a relatively narrow area for storage when not in use.

Wheels 24, 25 generally have solid rubber tires and can be spoked or solid wheels, as desired. An eight inch diameter solid wheel will be found satisfactory; however, obviously wheels of other diameter can be used and may even be found more suitable, depending on the overall size of the shopping cart.

Elongated support members 19, 21 are provided at their lower ends with casters 27, 28 which, contrary to wheels 24,25 which allow only linear movement, allow for turning of the shopping cart. Although casters 27, 28 are shown connected to elongated support members 19, 21 and wheels 24, 25 are shown connected to elongated support members 18, 20, it will be appreciated that these positions can be reversed, if desired.

The upper ends of elongated support members 19, 21 are connected to a support bar 29, the ends of which are slideable back and forth, toward and away from end 16 of body member 11 in slots 30, 31 in side brackets 32,33, respectively, of mounting bracket 34. Side brackets 32,33 are parallel with one another and are connected to end brackets 35,36, also preferably parallel to one another, which are riveted or otherwise attached, as shown by means 37 to bottom 13 of body member 11. End brackets 35,36 are of such a length and are connected to side brackets 32,33 in such a position as to maintain the spaced apart relationship of the elongated support members 19,21. Slots 30, 31 in side brackets 32,33 are chosen of such length as to allow for movement of support bar 29 and collapsing of supporting structure 12, as desired. The length of slots 30, 31 will, of course, depend somewhat upon the size of the shopping cart, in particular the length of the elongated support members.

Figure 3:
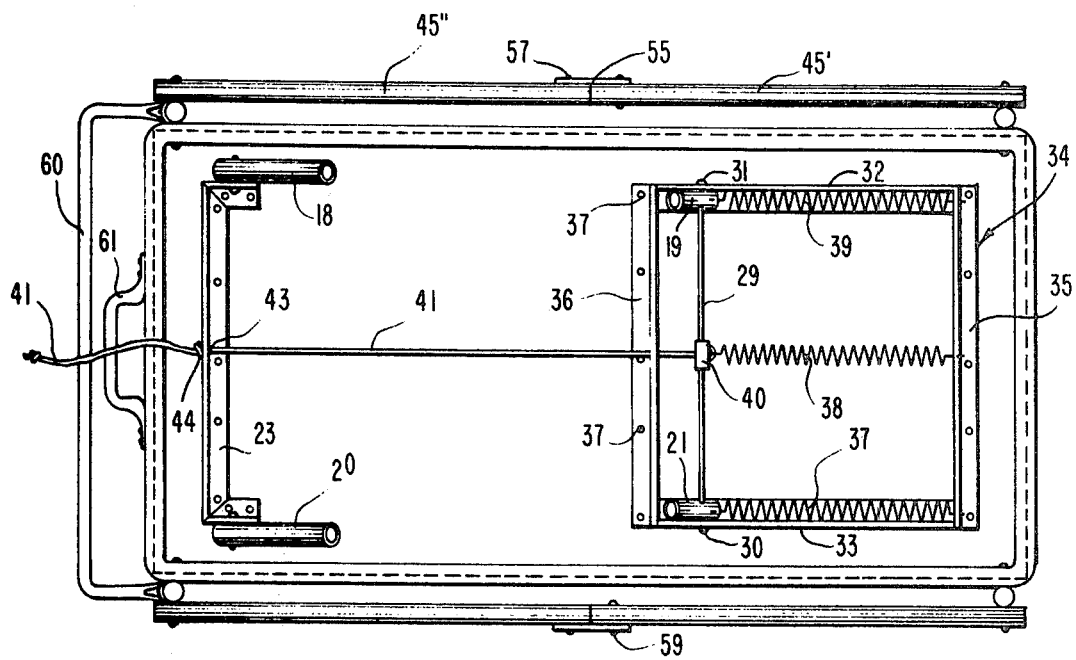
FIG. 3 is a plan view of the bottom of the body member of the carrier shown in FIG. 1 showing a spring mechanism for collapsing the supporting structure of the carrier but with the supporting structure therefor removed for the sake of clarity.

Connected to support bar 29 are a plurality of springs 37, 38, 39 as shown in FIG. 3, which provide tension on support bar 29 and insure forward movement of the support bar and collapse of support assembly 12, when desired. As shown in the figures of the drawing, three springs are used in the practice of the invention but obviously, two springs can be used if sufficient tension is provided. The main requirement is that there be at least two springs and these be connected to support bar 29 as are springs 37, 39 so as to maintain support bar 29 parallel to end brackets 35, 36 during movement. The springs should also be of equal tension as will be appreciated, so as to maintain this parallel relationship, otherwise support bar 29 will not track properly and the supporting structure 12 will not collapse.

To provide for collapse of support system 12, or to place it in operative position, as desired, there is connected to support bar 29, by means of a connector 40, a pull cord 41. The pull cord extends from connector 40 through a circular shaped opening 42, located midway between the ends of end bracket 36, through opening 43, located midway between the ends of spacer bracket 23. Opening 43 is in the shape of a key hole slot, for a purpose as hereinafter described, but it can be of other shapes which will accomplish the same purpose. The slot is vertically disposed with the larger portion of the slot located at the top.

There is provided in predetermined location in pull cord 41 an enlargement 44 such as a knot which is of sufficient size as not to allow pull cord 41 to slide through the smaller portion of key slot 43. When the shopping cart supporting system is in collapsed position, and it is desired to place supporting structure 12 in operative position, one merely takes hold of pull cord 41 and pulls on it until enlargement 44 is positioned in the key slot. This provides support members 18, 19, and 20, 21 in their proper extended position, and the shopping cart is then ready for use. When shopping has been completed, and it is desired to return the carrier to storage, pull cord 41 is released from key slot 43 and springs 37, 38, 39, having been placed under tension, now cause support bar 29 to move forward. This movement causes the elongated support members to pivot with respect to bottom 13 of the shopping cart and retract so as to collapse the support system. Pull cord 41 can be of various materials such as braided wire cable, nylon rope, or metal chain of suitable sized links. However, a nylon rope with a knot therein in predetermined location will be found satisfactory.

Although not shown in the drawing, it may be desirable to lock support bar 29 in the retracted position, i.e., when springs 37, 38, 39 are placed under tension, to prevent support assembly 12 from accidently collapsing. This can be done by various means as will occur to those skilled in the art. One such means is to provide threads on the ends of support bar 29 on which can be threaded large wing nuts that can be tightened by hand when the bar is retracted. Another such means is a pivoted hook located at the back end of side bracket 32 which can be hooked onto bar 29 when retracted.

Body member 11, as is most desired, comprises a framework of tubular upper side members 45, 46, bottom member 47, and end members 48, 49. Bottom member 47 is of one piece of tubing and is bent into rectangular shape as shown. End members 48, 49 are U-shaped tubular members. Upper side members 45, 46 comprise two components each, the forward components being identified by reference numerals 45' 46'. The end of component 45' is provided with a fixedly secured end insert 50, as is shown in FIG. 2 of the drawing, for insertion, male-and-female fashion, into the open end of component 45'' of upper side member 45. The reason for this will hreinafter be made clear. A similar insert is provided in the end of component 46', although not shown in the drawing for sake of clarity. Upper side members 45, 46 and end members 48, 49 are connected together as shown by means of tubing rivets such as are identified by reference number 50'. These connections are such as to allow pivotal movement of end members 48, 49 with respect to bottom 13 and side members 45, 46 so that the framework of body member 11 can be collapsed, as hereinafter explained.

While the tubular framework can be of various metal tubes, as desired, and of various diameters, aluminum tubing ⅜ inch in diameter is suggested. This tubing offers sufficient strength to carry any load more likely to be carried and, moreover, is not only relatively easy to handle in manufacture but offers a relatively inexpensive mode of manufacture.

To the framework, as earlier described, is attached a netting 51 that provides sides 14, 15 and ends 16, 17 for the framework of body member 11. Netting 51 can be of various materials, e.g., cotton netting or netting of manmade fibers such as nylon and polyester, or even of metal; however, a netting of nylon fibers will be found quite durable and long-lasting. Moreover, it can be easily provided of various colors, and rather inexpensively. The top of netting 51 as is shown, is provided with edge or border means 52 which may be of the same or different material as the netting and in which is located a plurality of fasteners 53. Snap fasteners are ideally suited for this purpose, however, other fastener means can be used, if desired. Edge means 52 is of such width and the fasteners are so located in it that the edge of netting 51 can be wrapped or folded over the upper part of the tubular framework, as shown (FIGS. 1 and 2), and snap fasteners 53 snapped together to secure the netting in place. The lower part of netting 51 is located and secured between planar bottom member 13, which may be, for example, pressed board or the like, and tubular bottom member 47. Bottom member 13 is secured to tubular bottom member 47, according to conventional techniques, by means of rivets or the like such as are identified by reference number 54. Attached to component 45' of side member 45 is a fastener 55 having a notch 56 located in the end thereof and which is rotatable counter-clockwise so that notch 56 engages pin 57 located on and extending outwardly horizontally from near the end of component 45'', as shown. A similar fastener 58 is located on component 46' and is fastened thereto by means of a rivet 59. A complementary engaging pin for fastener 58 is shown in the drawing and is like that identified by reference numeral 57. Thus, when components 45' and 45'' and components 46' and 46'' are in engaged relationship, they are prevented from becoming disengaged by means of fasteners 55 and 58.

The framework of body member 11, as is support system 12 for the body member, is collapsible. This is accomplished by rotating fasteners 55 and 58, by hand, clockwise and counterclockwise, respectively, thereby disengaging notch 56 of fastener 55 from pin 57, and the notch in fastener 58 from its pin. With this accomplished, the end components are pulled away from one another so as to retract the end inserts (reference numeral 50) from their respective location. End members 48, 49 can then be rotated toward one another, as is indicated in FIG. 2 of the drawing, while at the same time pivoting the respective components of the side members into a suitably collapsed position. It may be necessary in some cases to unsnap edge 52 of the netting, or at least a section thereof, as shown in FIG. 2, to allow for easier collapsing of the body member framework. While not quite made plain from the drawing, edge 52 of the netting need not be as continuous as shown, unless desired. The edge can be merely a plurality of discontinuous, rather wide, straps sufficient in number and location to accomplish the purpose intended. One end of the strap or edge 52 is preferably permanently attached to netting 51 as by stitching or other means.

Shopping cart or carrier 10 is generally provided in the preferred embodiment with a liner or bag (not shown in the drawing) of complementary cubic shape to the inside of body member 11 whereby groceries or the like can be protected, if desired, from inclement weather. The bag, which can be of plastic or canvas or other desired waterproof material, is provided with a flap which extends across the width of the bag at the top and fastens to the side of the bag by means such as snap fasteners. It will be appreciated, however, that the bag can be provided with a zipper or other fastening means, if desired.

At the rear of body member 11, there is provided a tubular shaped handle 60 which is attached by screw means (not shown) to the vertical legs or components of end member 49. Tubular handle 60 enables a shopper to easily push the shopping cart or carrier 10 through the market while shopping. While in the practice of the invention, screw members are used for attachment of tubular handle 60 to end member 49, it will be appreciated that handle 60 can be attached to the end member by other means, if desired. As a matter of fact, handle 60 is optional and is not actually required in the practice of the invention. To the bottom of member 47, in the preferred embodiment, is attached a handle 61. This serves as a means to pull the shopping cart or carrier when support assembly 12 is in the collapsed position, as described earlier. Thus, with only wheels 24, 25 on the ground, the collapsed cart is pulled, or if desired, pushed, without any great effort.

Figure 4:
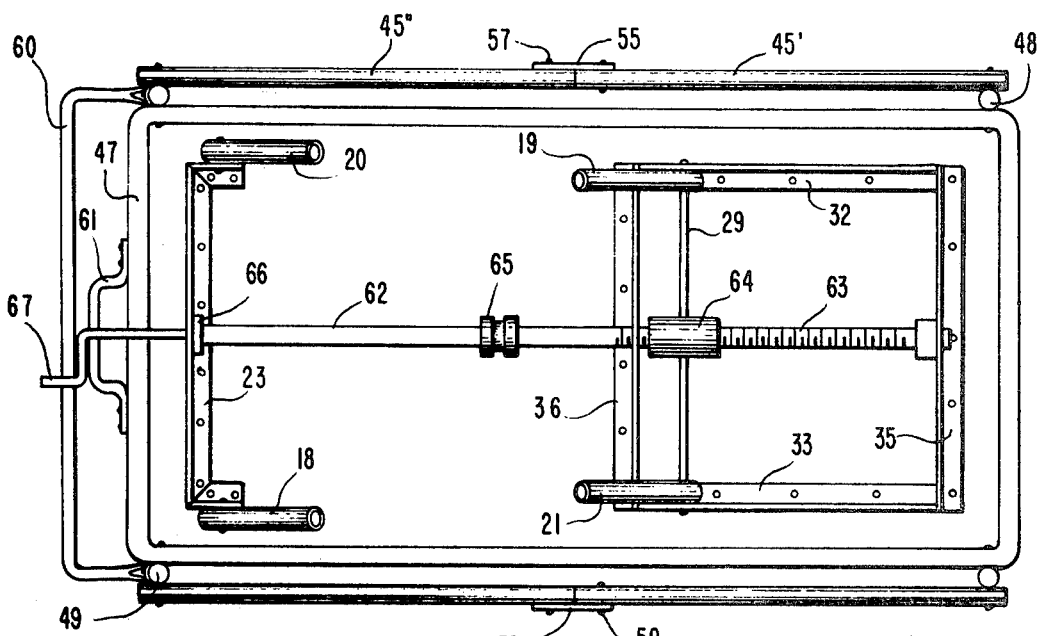
FIG. 4 is a plan view of the bottom of the body member of the carrier showing an alternative means for collapsing the supporting structure.

An alternative means to collapse support assembly 12 is shown in FIG. 4 of the drawing and will now be described. Therein adjusting rod 62, threaded at the front end thereof as indicated by reference numeral 63, is provided in combination with an internally threaded member 64. Adjusting bar 29 is also connected to threaded member 64 which is located midway along the length of bar 29 and in such fashion as to maintain the bar, as the ends thereof move in slots 30, 31, in parallel relationship to brackets 35,36. Adjusting bar 62 passes through, and is maintained in proper aligment by a pilot bushing 65 and guide 66. At the end of adjusting bar 62 is provided a handle 67 for rotation of adjusting rod 62. When handle 67 is turned, the threads 63 mating with the internal threads in member 64 cause adjusting bar 29 to move toward or away from end 16. Thus, the elongated support members are either retracted so as to collapse the support assembly or caused to open into operative position.

Figure 5:
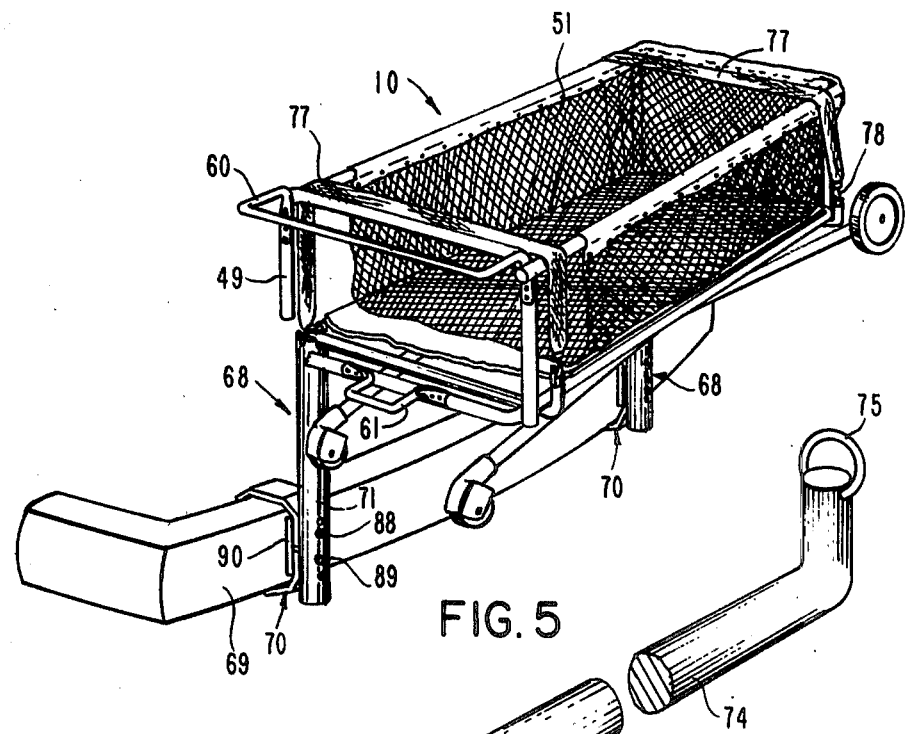
FIG. 5 is a view showing the shopping cart of FIG. 1 with the supporting structure collapsed and the carrier supported for transport by means attached to the bumper of a motor vehicle.
Figure 6:
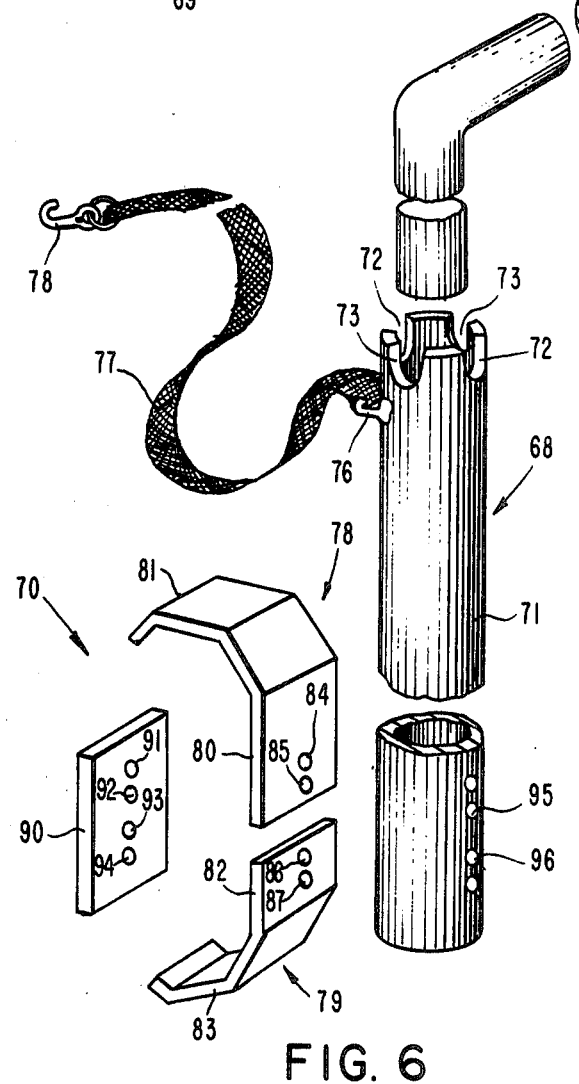
FIG. 6 is an enlarged perspective view showing the support bracket for the carrier and the bracket means for attaching the support bracket to the bumper of the car shown in FIG. 5.

Turning now to FIG. 5 of the drawing, there is shown means 68 (two are provided) for supporting the shopping cart 10 in transport, fastened as hereinafter described to bumper 69 by means of bracket means 70 better shown in FIG. 6 of the drawing. Support means 68 comprises a vertical tubular member 71 provided at the upper open end thereof with pairs of cutouts of U-shaped configuration 72,73. The cutouts of each pair are in direct alignment with one another and imaginary diameters of tubular member 71 connecting the cutouts in each pair are at right angles to one another. The reason for this will be later explained.

In the upper end of upright or vertical member 71 is located a carrier bar 74, one end of which is bent at a right angle and intrudes into the open upper end of member 71, as shown. Carrier bar 74 can be a solid rod and is of a diameter so as to provide a loose but relatively tight fit in tubular upright member 71. When not in use to support shopping cart 10, carrier bar 74 is moved so as to come to rest in U-shaped openings 73. In this location, carrier bar 76 will generally be parallel with automobile bumper 69 on which support means 68 is attached. When shopping cart 10 is to be placed upon carrier bars 74 for transport, carrier bars 74 are moved from their inoperative position in opening 73 to their operative position which is, in general, perpendicular to bumper 69 of the car. Carrier bar 74 is maintained in this operative position by resting in U-shaped openings 72.

As will be expected, vertical members 71 and carrier bars 74 can be of various diameters and lengths, as desired, depending somewhat on the size of shopping cart and load to be transported. In general, a carbon steel pipe 8" long having ½ inside diameter will be found suitable for use as the vertical member. Carrier bar 74 can be a solid iron bar of ⅜ in diameter and should be long enough to provide support across the entire width of the shopping cart and so that about 4" of the end intrudes into the end of the vertical tubular member. The other end of carrier bar 74, i.e., the end opposite from that which intrudes into vertical member 71, is also bent at a right angle as shown, but in the opposite direction and is in the same plane as the first bent end. A ring 75 is provided in this end for a purpose which will be later explained. The vertical end of carrier bar 74 containing ring 75, as will be appreciated, helps to retain carrier or shopping cart 10 on carrier bar 74 during transport.

The upper end of vertical tubular member 71 is provided with a loop 76 which is welded or otherwise permanently fixed to member 71. To loop 76 is connected a belt 77 having fastener hook 78 at the free end as shown. When transporting shopping cart 10, as shown in FIG. 5, belt 77 is passed over the top of the shopping cart and fastener hook 78 is secured to ring 75. Thus, the shopping cart is held securely on carrier bars 74.

The lower part of upright support member 71 is bracketed to bumper 69 by bracket means 70 which comprises an upper bracket member 78 and a lower bracket members 79. Bracket member 78,79 are of identical construction and comprise two metal lamina of suitable length, width and thickness bent as desired to provide a curved end for fitting over the top and bottom of an automobile bumper. As shown in the drawing, bracket member 78 is provided with a face 80 and a curved end 81, and bracket member 79 is provided with a face 82 and curved end 83. Curved ends 81, 83 fit over the top and bottom of bumper 69 as shown. Faces 80, 82 are each provided with two openings, 84,85 and 86, 87 of suitable diameter, through which is inserted fastening bolts 88, 89, as hereinafter described.

Bracket means 70 is of generally universal application and will fit most bumpers or can be made to fit a particular bumper by further bending ends 81 and 83, as desired. However, as will be appreciated, it may be desirable to provide different size brackets to fit particular bumpers on a specific car and to make the ends of a smoother curve. In the case of extra wide bumpers, i.e., from top to bottom, it may even be necessary to utilize a spacer such as is identified by reference numeral 90 (FIG. 6). Spacer 90 is of generally rectangular cubic shape and is provided with four openings, 91, 92, 93, 94 which can be made in use to match with openings 84,85,86,87 respectively. As will be appreciated, when not using a spacer, faces 80, 82 of bracket means 70 are overlapped so that openings 84 and 85 coincide with openings 86 and 87, respectively. These openings, then, in cooperation with openings 95 and 96 in the lower part of upright support member 71 provide means through which fastening bolts 88, 89 can be inserted to fasten bracket means 70 to support member 71.

Figure 7:
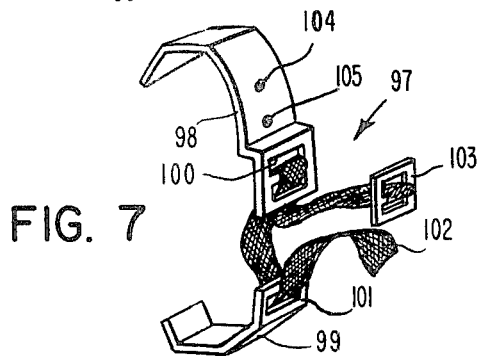
FIG. 7 is a view in perspective of another type of bracket means that can be used in attaching the support bracket for the shopping cart to the bumper of a motor vehicle.

An alternative bracket means 97, which may be satisfactory for use in certain instances, is shown in FIG. 7. Therein, as shown, bracket means 97 comprises members 98, 99 of strap metal, the outer ends of which are curved so as to fit over the top and bottom of an automobile bumper. Members 98,99 are provided at the inner ends with openings 100, 101 through which belt 102 with buckle 103 on one end can be threaded connecting the two members together. The face of member 98 is provided with openings 104, 105 which match with openings 95, 96 in vertical support member 71. Bracket member 98 is then connected to support member 71 by means such as bolts 88, 89. In bracketing bracket means 97 on bumper 69, the curved ends are placed over the upper and lower portion of the bumper and belt 102 is tightened as desired.

In anticipation of use, the shopper will retrieve shopping cart or carrier 10 from its storage location and pull it by handle 61 to a position generally parallel to bumper 69 located on his automobile. At that time, he will operate support bar 29, by pulling on pull cord 41, so as to place elongated support members 18, 19 and 20, 21 in operative position with respect to one another. Knot 44 in pull cord 41 will be engaged in the key slot 43 whereby to lock support assembly 12 in the operative position. Thus, bottom 13 of carrier 10 will be generally parallel to the ground and all four wheels of the carrier will be in engagement with the ground. This action provides that bottom 13 of body member 11 is located just vertically above carrier bars 74 when placed in their operative position. Carrier bars 74 are then pivoted from their inoperative position coming to rest in U-shaped channels 72 of vertical supports 71, thus facing outwardly from the bumper. Pull cord 41 is then pulled again so as to disengage enlargement 44 from the key slot so that support bar 29, being under tension by spring member 37, 38, 39 will move toward the front end of body member 11 thereby collapsing support assembly 12. With collapsing of the support assembly, shopping cart 10 then is supported on carrier bars 74. The shopper is ready then to hook belts 77 to rings 75 and proceed to the shopping center. When arriving at the shopping destination, the shopper loosens belts 77 and pulls cord 41 so as to engage knot 44 in the keyhold slot. This extends springs 37, 38, 39 and provides support assembly 12 in the operative mode. Carrier bars 74 are then pivoted to their inoperative position and are engaged in U-shaped shots 73 in upright support member 71. The shopper then does the shopping, putting all of the items in body member 11, or in the event body member 11 is provided with a bag such as earlier described, in the bag, and proceeds through the check out point in the usual fashion. However, after the items are checked through the check-out point, the store attendant places the items either back into the bag or body member 11. The shopper then proceeds back to his automobile and places the shopping cart 10 on the support bracket as previously described. In arriving home, the shopper provides the support assembly 12 in the operative position as before described, moves carrier bars 74 to the inoperative position and then pushes shopping cart or carrier 10 into the kitchen or other desired location for unloading of the contents. However, it will be appreciated that prior to doing this, if desired, in some instances support assembly 12 can be collapsed and the shopping cart 10 can be pulled by means of handle 61 to a desired location for unloading.

Although not shown in any of the figures of the drawing, it may be desirable to provide an infant seat in combination with the shopping cart. In this case, the portion of netting 51 forming back end 17 of the shopping cart is provided with suitable openings through which a child's legs may be placed. The seat is of simple construction and comprises a rectangular seat of, e.g., wood or plastic, to each corner of which is fastened a hangar. These hangars may be of strap metal, curved at the free end, or may comprise a belt at the free end on which may be provided a curved member for connection with the body framework. Thus, the curved parts of the straps can be fashioned so as to fit over tubular side members 45, 46 and the hangars are so attached to the seat as to support all four corners of the seat and maintain it in a horizontal fashion.

In the preferred embodiments of the invention, two different means are disclosed for providing the support assembly in operative and collapsed modes. It will be appreciated, however, that other means with proper mechanical components in combination therewith, can be provided to accomplish this purpose such as electrical or hydraulic, or mechanical means such as a winch.

As many different embodiments of this invention will occur to those skilled in the art, it is to be understood that the specific embodiments of the invention as presented herein are intended by way of illustration only and are not limiting upon the invention, but that the limitations thereon are to be determined only from the appended claims.

What we claim is:

1. Wheeled carrier for carrying a plurality of relatively small objects from one location to another comprising a collapsible body member comprising a box-like frame work comprising a bottom member, vertically disposed front and back members depending from said bottom member and pivotally connected to said bottom member pivotal toward one another, and side members pivotally connected at their ends to said end members, said side members each comprising two components connected together and capable of being disconnected from one another whereby said end members can be pivoted toward one another and toward said bottom member, a planar bottom associated with said bottom member, a collapsible netting connected to said bottom member, said end members, and said side members providing in combination with said frame work an open top body member, and a collapsible supporting structure connected to the bottom member for supporting the body member comprising two pair of elongated support members, one member in each pair being fixedly connected to said planar bottom of the body member adjacent to the said back end in predetermined spaced apart locations, means associated with said planar bottom of the body member comprising a support bar and permitting movement thereof in a plane parallel to the planar bottom of said body member toward and away from the front end of the body member, the other member in each pair of support members being connected to said support bar in predetermined spaced apart relationship, and means connecting the pairs of elongated support members together intermediate their ends and in predetermined spaced apart relationship and the members in each pair so as to allow the members to pivot with respect to one another, whereby on movement of said support bar the elongated support members are collapsed or placed in operative position as desired, and wheels attached to two of the said elongated members for forward and backward movement of the carrier, and casters attached to the other two of said elongated members providing turning motion.

2. Wheeled carrier for carrying a plurality of relatively small objects from one location to another according to claim 1 wherein said means associated with said bottom further comprises a pair of elongated brackets attached to the said planar bottom of the body member in predetermined spaced apart parallel locations and being disposed in a direction from said front member to said back member, an elongated slot of predetermined length being provided in each bracket and being in a horizontal plane parallel to the planar bottom, the ends of said support bar being located in said slots, spring members attached to said support bar and to said associated means, and attached to said support bar in opposition to the spring members, means for moving said support bar while placing the spring members under tension whereby on release of the tension the support bar moves and the supporting structure is collapsed.

3. Wheeled carrier for carrying a plurality of relatively small objects from one location to another comprising a collapsible body member comprising a box-like frame work comprising a bottom member, vertically disposed front and back members depending from the said bottom member and pivotably connected to said bottom member pivotal toward one another, and side members pivotally connected at their ends to said end members, said side members each comprising two components connected together and capable of being disconnected from one another whereby said end members can be pivoted toward one another and toward said bottom member, a planar bottom associated with said bottom member, a collapsible netting connected to said bottom member, said end members, and said side members providing in combination with said frame work an open top body member, and a collapsible supporting structure connected to the bottom member for supporting the body member comprising two pair of elongated support members, one member in each pair being fixedly connected to said planar bottom of the body member adjacent to the said back end in predetermined spaced apart locations, means associated with said planar bottom of the body member comprising a support bar for movement in a plane parallel to the said planar bottom of said body member toward and away from the front end of the body member, the other member in each pair of support members being connected to said support bar in predetermined spaced apart relationship, means threaded internally connected to said support bar intermediate the ends thereof, elongated means capable of rotation having external screw threads at one end thereof mating with said internally threaded means and having a means for rotating the said elongated means whereby on rotation the said support bar is moved toward and away from the front end of the body member, and the elongated support means are collapsed or placed in operative position as desired, and wheels attached to two of the said elongated members for forward and backward movement of the carrier, and casters attached to the other two of the said elongated members providing turning motion.

4. Means for carrying a plurality of relatively small objects from one desired location to another comprising in combination a collapsible, wheeled carrier comprising an open top, box-like collapsible body member having a bottom member, right and left sides, and a front and back end; a collapsible, supporting structure connected to the body member for supporting the body member, and wheels attached to the supporting structure for movement of the carrier from one location to another as desired; and means for attachement of the carrier to a motor vehicle for supporting the carrier for transport comprising two spaced apart bracket means for attachment to a motor vehicle bumper, a vertically disposed tubular member attached to each said bracket means, a carrier bar rotatably associated with each verticle member comprising a horizontally disposed portion for supporting the wheeled carrier by its said bottom member, one end of which is supported in said tubular member, said carrier bar being rotatable to and from an operative position for support of the carrier to an inoperative position.

5. Means for carrying a plurality of relatively small objects from one desired location to another comprising in combination a collapsible, wheeled carrier comprising an open top, box-like collapsible body member comprising a bottom member comprising a planar bottom, end members pivotally connected to said bottom member and pivotable toward one another, elongated upper side members each pivotally connected at one end to one end member and at the other end to the other end member, each said side member comprising two components detachably connected to one another, a collapsible supporting structure connected to the said collapsible body member for supporting the body member comprising two pairs of spaced apart elongated support members, means attached to said planar bottom of the body member capable of movement in a plane parallel to the planar bottom toward and away from the front end of the body member, one member in each said pair of elongated support members being fixedly and pivotally connected at one end in said spaced apart relationship to the body member in a predetermined location near the back end of the body member, and the other member in each pair being pivotally connected at one end in said spaced apart relationship to said means capable of movement, and elongated axle means connecting the fixedly connected elongated members together at their free ends for maintaining them in the desired spaced apart relationship, a wheel at each end of the axle means and positioned thereon for rotation in a manner so as to provide movement to the carrier in a linear direction, a caster provided on the free ends of each of the other elongated members for providing turning to the said carrier, means for pivotally connecting the elongated members in each pair together intermediate their end for maintaining the pairs of elongated members in said spaced apart relationship whereby on movement of the said means capable of movement the support structure can be collapsed toward and away from the bottom of the body member, and means for detachable attachment of said wheeled carrier to a motor vehicle for supporting the carrier for transport comprising two spaced apart bracket means for attachment to a bumper of the motor vehicle, a vertical support member attached to each of said bracket means and a carrier rod supported by each vertical support means rotatable to and from an operative position from a position of rest for supporting the carrier by its bottom member.

6. Means for attachment of a collapsible wheeled carrier for a plurality of relatively small objects having an open box-like shape to a motor vehicle bumper for transport comprising in combination a bracket means attachable to a motor vehicle bumper, an upright vertical support member of tubular shape connected to the bracket means at one end, and a carrier bar comprising a horizontally disposed portion for supporting the bottom of said carrier, the ends of which are bent 90 degrees in opposite directions to one another and in the same plane, one end of said carrier bar being located in the other end of said tubular verticle support member, said carrier bar being capable of rotational motion from a position of rest somewhat parallel to the motor vehicle bumper to a position of rest somewhat perpendicular to said motor vehicle bumper and back again, as desired, a belt having a fastener at one end, the other end being attached to said vertical support member, and a ring on the other end of the carrier bar whereby when the fastener on the belt is fastened to the ring, the carrier can be held securely on the carrier bar.

* * * * *